March 10, 1931.  H. E. HERSHEY  1,795,650
REMOTE CONTROL SYSTEM
Filed Sept. 3, 1927  2 Sheets-Sheet 1

Fig. 1

Inventor
Harry E. Hershey

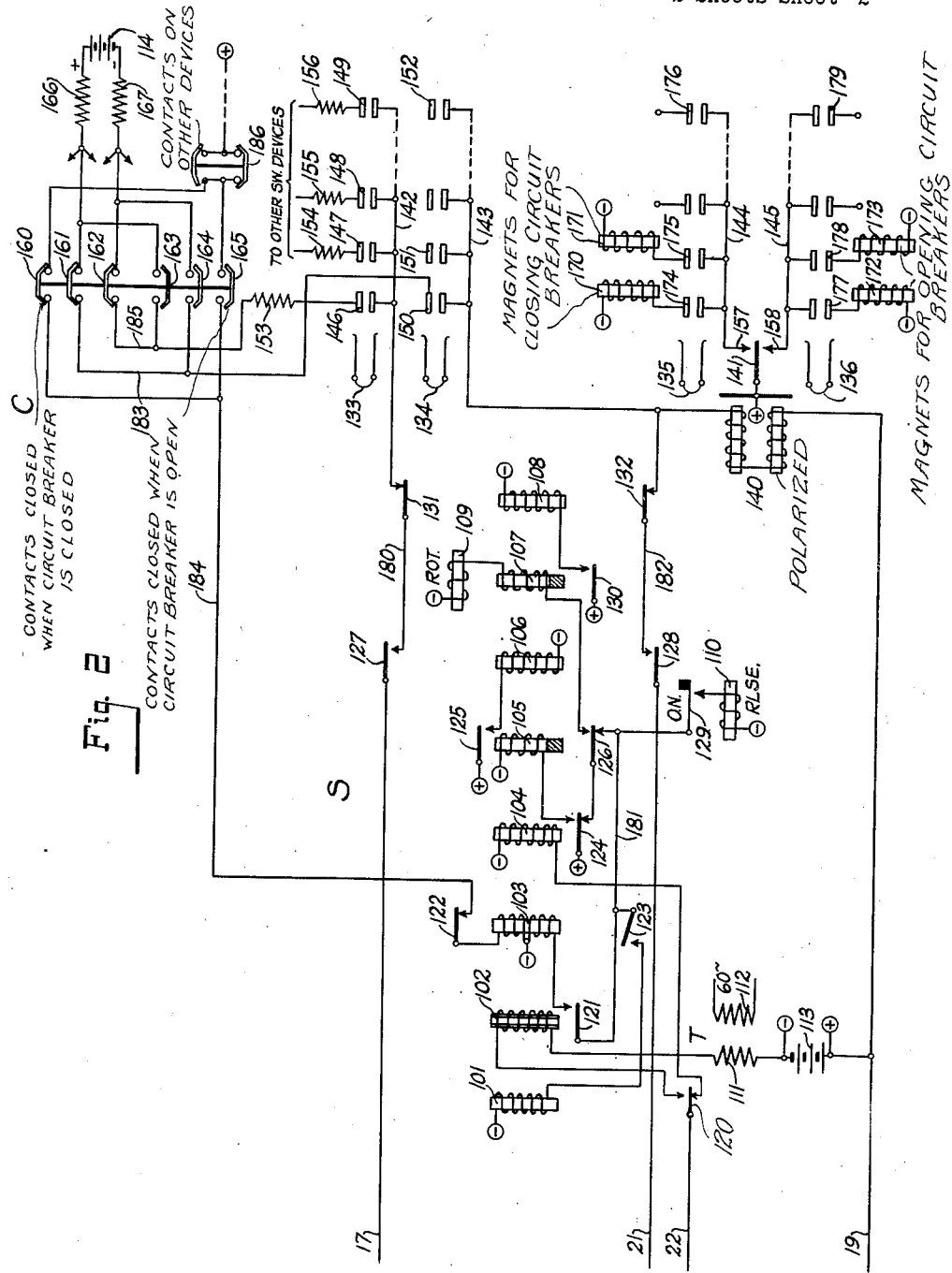

Patented Mar. 10, 1931

1,795,650

UNITED STATES PATENT OFFICE

HARRY E. HERSHEY, OF OAK PARK, ILLINOIS, ASSIGNOR TO RESERVE HOLDING COMPANY, OF KANSAS CITY, MISSOURI, A CORPORATION OF DELAWARE

REMOTE-CONTROL SYSTEM

Application filed September 3, 1927. Serial No. 217,481.

The present invention relates in general to remote control systems, more particularly to such systems in which a plurality of switching devices are selected and supervised from a remote point over a trunk line, and the principal object of the invention, briefly stated, is the provision of a new and improved remote control system, the improvements tending to make the system less expensive to install and maintain without impairing its reliability and efficiency.

Remote control systems heretofore have been of two general classes, visual and audible. In the visual system, the position of each switching device is constantly indicated by a lamp or other suitable signal, and when that device changes its position, the selecting switches extend circuits to alter the lamp indication to correspond to the new position. Such a system, because of the multiplicity of apparatus involved, is expensive to install and maintain.

As a further object of the present invention, I provide a new and improved visual remote control system, a system which might be termed "on call visual system" by reason of the fact that the position of the power switching devices are visually indicated only when the despatcher performs certain operations to bring up the indications.

As a further object of my invention, I provide a control system wherein when the despatcher selects any desired power switching device, he is apprised of the device that he has selected by a visual indication, he is also apprised of the position of the device by that visual indication, and if he desires he may change the position of that device, that change being instantly recorded on his visual indicator.

Further objects, not specifically mentioned here will be best understood from the detailed description and claims which follow.

The drawings, comprising Figs. 1 and 2, when arranged with Fig. 1 to the left of Fig. 2 with correspondingly numbered lines in alignment, represent by the usual circuit symbols, sufficient apparatus to enable a clear understanding of my invention.

In Fig. 1, I show the equipment which would be provided at the despatcher's station, comprising a zero center ammeter 12, arranged with a special scale indicating the device numbers and open or closed positions.

Associated with the ammeter is an indicating block 23, containing twenty holes, one of the open and one for the closed position of each of the ten devices supervised by the meter. By inserting a suitable pin in the hole associated with the position occupied by a device, the despatcher may make a record of that position, that record serving as a check of the position of the device. I also provide the operating key, K comprising springs 1 to 6 inclusive, through the operation of which the despatcher may open or close a switching device. The despatcher may open or close a switching device. The despatcher's station is also equipped with a calling device 10, which may be any well known impulse transmitting device such as is used in automatic telephone systems, and a key 7 for throwing that device in or out of the circuit. The despatcher's station is equipped with a telephone ringer 9 which is bridged across the trunk conductors to the substation in series with the condenser 8, that ringer operating when a device at the substation automatically changes its position to signal the operator that a change has taken place.

In Fig. 2, I show the devices supplied at a substation, those devices comprising a selecting switch S, having four wipers, each of which travels over a separate group of bank contacts. This selector switch S, may be a well known Strowger connector switch, shown on page 53 of the second edition of the book "Automatic Telephony" by Smith and Campbell, or it may be a well known minor switch, also shown on page 94 of the above referred to book. In the present useage of either switch, the wipers are required to travel only in a single plane, so that if the Strowger switch is used, the vertical magnet and equipment associated with that magnet can be omitted from the switch structure. The substation is also provided with a polar relay associated with the selecting switch, through the operation of which the devices are thrown in or out. The substation is assumed to contain a plurality of switching devices, the number of these devices not to exceed the number of contacts available to any one wiper in the selecting switch. For purposes of example, assume that there are ten switching devices in the substation, and that each wiper of the selecting switch has access to ten bank contact sets. With this assumption, each bank contact set controls one device. For the purpose of illustration, the control apparatus associated with the first bank contact is shown. Assuming this to be a circuit breaker C, that breaker is equipped with two sets of auxiliary contacts, the first set comprising springs 160 to 162 inclusive is closed when the circuit breaker is in its closed position, and the second set comprising springs 163 to 165 inclusive are closed when the circuit breaker is in its open position. These contact sets, are available to the selecting switches through wipers 133 and 134, and when those wipers are placed on the proper contact set, the circuit from a battery 114 is completed through one or the other contact sets depending upon whether the circuit breaker is opened or closed to place a potential on the trunk conductors leading back to the despatcher's office. Associated with the circuit breaker C are the operating magnets which open and close the breaker, those magnets being controlled by relays 172 and 170 respectively. The operation of these relays and devices will be best understood from the detailed description which follows.

In the drawings, I have shown a plurality of battery symbols, to avoid an unnecessary complication. In an actual installation, the selecting switch, would be operated from a twenty-four volt storage battery, and all of the wires leading to the battery symbols indicated in Fig. 2, except the battery 114 would be connected to the single twenty-four volt battery 113. The battery 114 at the substation, and the battery 20 at the despatcher's station, might well be 45 volt heavy duty radio "B" batteries, which are inexpensive dry batteries capable of furnishing sufficient current for the purpose of which the batteries 20 and 114 are used, having a sufficiently long life to warrant their installation.

Having thus described my invention in general, I will now proceed with a detailed description of its operation.

*Supervising circuit breaker C*

Assume now that the despatcher desires to supervise the circuit breaker C, he operates the key 7, thereby closing a circuit from positive battery at the substation, conductor 19, key spring 7, calling device 10, conductor 22, spring 120 and its break contact through the winding of the relay 104 to negative battery. Relay 104 energizes over this circuit, and at springs 124 closes the obvious circuit for the relay 105, which relay energizes and at springs 126 prepares a point in the impulsing circuit of the switch S. Since the circuit breaker C is connected to the first contact set in the banks of the switch S, the despatcher will operate the calling device 10 to transmit one impulse to the relay 104. Relay 104 deenergizes during the open circuit portion of this impulse, and at springs 124 opens the circuit of relay 105. Relay 105 however remains in its energized position because it is equipped with a copper slug on the core, to make it slow to release. Relay 104 closes at spring 124 and its break contact a circuit from positive battery through those springs and spring 126 and its make contact, through the winding of series relay 107, through the rotary magnet 109 to negative battery. The rotary magnet energizes over this circuit, and advances the shaft, not shown, carrying wipers 133 to 136, inclusive, one step into engagement with the first set of contacts in the bank. Relay 107 upon energizing, closes a circuit for relay 108, which energizes and at springs 131 and 132 opens the control circuit to prevent the operation of any devices at this particular time. If the despatcher had operated the calling device 10 to transmit more than one impulse, relay 107 would have remained energized throughout the train of impulses because of the copper collar on its core, thereby maintaining the relay 108 energized as long as the wipers are in motion. When the calling device 10 recloses the circuit just traced for the relay 104, that relay reenergizes, and opens the circuit of the rotary magnet 109 and the relay 107, permitting them to fall back. Relay 107 falls back and opens the circuit of relay 108, to extend the control circuit, for the purpose pointed out hereinafter. The energization of relay 105, mentioned above, closes the obvious circuit for relay 106, which at springs 127 and 128 closes points in the supervisory and control circuits, so that when the switch wipers have been brought to rest upon the desired contact, in this case the first contact of the bank, circuits for supervising the position of the selected device are completed.

*Supervising circuit breakers C*

The positioning of wipers 133—136 upon the first contact of the bank, closes a circuit for the ammeter 12 which is traceable from positive pole of battery 114, resistance 166, contact 161, it being assumed that the circuit breaker C is in its closed position at this time, conductor 183, contact 150, wiper 134 engaging that contact, common 143, springs 132, conductor 182, springs 128, conductor 21, springs 6 of the operating key, conductor 18, springs 1 of the operating key, conductor 16, through the element of the ammeter, through resistances 13, 14 and 15, conductor 17, springs 127, conductor 180, spring 131, common 142, wiper 133, contact 146, resistance 153, conductor 185, springs 162, resistance 167, to the negative pole of battery 114. The battery 114, as has been previously explained is a 45 volt dry battery, the kind known as the radio "B" battery, and the total value of resistances 166 and 167, 153, 13, 14 and 15, and the resistance of the element of the ammeter 12, and of conductors 21 and 17, is of such a value as to cause the ammeter needle to swing to the position 1 on its scale. Since the circuit breaker C is closed, and positive battery is picked up on the contact 150, the ammeter 12 will swing to the right, the needle coming to rest opposite the first scale division, thereby indicating that the device No. 1 has been selected and that that device is in its closed position. The despatcher upon noting the position of the circuit breaker C, may desire to open that breaker, for which purpose he operates the key K to close springs 2 and 3 and to open spring 1, thereby closing the circuit from positive battery 20, springs 3, conductor 21, springs 128, conductor 182, springs 132, through the winding of polar relay 140, conductor 19, through springs 2 of the operating key, to the negative pole of battery 20. Current flows over this circuit, operating the polar relay in the direction to move the spring 141 down against the spring 158, thereby completing the circuit for the auxiliary relay 172, that circuit being traceable from positive battery through springs 141 and 158, wiper 136, contact 177, through the winding of relay 172 to negative battery. Relay 172 energizes and closes the circuit for the operating magnet of the circuit breaker C to open that circuit breaker. Since the particular type of electro-magnetic circuit breaker used is not an important part of this invention, this operating magnet and the various mechanical elements of the circuit breaker have been omitted from the drawings. Any type of electro-magnetic circuit breaker may be operated by this arrangement, since all such circuit breakers are provided with two operating magnets, one to open the breaker and the other to close the breaker. In response to the operation of the relay 172, the circuit breaker C opens, opening contacts 160 to 162, inclusive and closing contacts 163, 164 and 165. After the despatcher has held the key K operated for what he deems to be sufficiently long interval of time to permit the circuit breaker to open, he restores it, thereby closing at springs 1 the previously traced circuit over the ammeter 12. Current now flows through the ammeter in the opposite direction, over a circuit traceable from the positive pole of battery 114, resistance 166, contacts 163, resistance 153 and thence over the previously traced circuit back to contact 150, through contacts 164, resistance 167, the negative pole of battery 114. The ammeter 12 swings its needle to the left, stopping upon the first division, since the resistance of the circuit is the same as before, thereby indicating that the device No. 1 is in its open position. Since the breaker C was closed when the despatcher started the foregoing operation, a pin would be in the right hand No. 1 hole in the indicator 23, to designate the closed position of the device. To complete the cycle of operations incidental to opening the breaker C, the despatcher should now remove this pin and place it in the left hand No. 1 hole, to thereby indicate the open position occupied by the breaker. The despatcher having finished the operation, may now release the equipment by restoring the key 7, thereby opening the circuit for relay 104, which restores and prepares a point in the release circuit of the switch S. Relay 104 upon restoring opens the circuit of slow-to-release relay 105, which restores after an interval completing the circuit for release magnet 110 which is traceable from positive battery through the spring 124 and its break contact, spring 126 and its break contact, off normal springs 129, through the winding of release magnet 110 to negative battery. Release magnet 110 operates, withdrawing the pawl, not shown, from the shaft, not shown, to restore the wipers 133 to 136 to their normal position. The apparatus is now in its normal position, and will so remain either until the despatcher performs a further operation or a circuit breaker at the sub-station automatically opens.

*Automatic supervision*

Assume now that the circuit breaker C at the substation is closed, and that because of an over-load condition the automatic release devices of that circuit breaker function to open it. With the device in its closed position, a circuit is closed for relay 103 from negative battery through the relay, springs 122, conductor 184, through contacts 160, if the device C is in its closed position, or through the contacts 165 if the device is in its opened position, through similar contacts 186 on each of the other devices in the substation to positive battery at the tenth or last device. Relay 103 is maintained energized over this circuit. When any device in the substation changes its position, this chain circuit will be momentarily open, permitting the relay 103 to restore. If the switch S is in its normal position, as it is now assumed to be, relay 104 will be normal, and a circuit will be completed from positive battery through spring 124 and its break contact, spring 126 and its break contact, conductor 181, springs 123, through the winding of relay 101 to negative battery. Relay 101 energizes over this circuit, and at springs 120 closes a circuit for the ringer 9 at the despatcher's office, that circuit including the ringer 9, conductor 19, battery 113, secondary winding 111 of the transformer T, winding of relay 102, spring 120 and its make contact, conductor 22, calling device 10, condenser 8, to the other terminal of the ringer 9. The alternating current induced in the transformer winding 111 traverses this circuit, operating the ringer 9 to attract the despatcher's attention. When the despatcher answers the call by operating key 7, he closes a direct current path from the battery 113 over the circuit just traced, thereby completing a circuit for relay 102, permitting that relay to energize. The relay 102, being equipped with a copper sleeve on its core, will not pull up when alternating current is passing through its winding. Relay 102 upon energizing, closes springs 121, closing a circuit from the positive battery on conductor 181, through the lower winding of relay 103 to negative battery, reenergizing the relay 103, which locks itself at springs 122 to the previously traced chain circuit through the contacts on the devices at the substation. The despatcher now in order to ascertain which device changed its position, dials a series of digits 1. The first digit moves the switch wipers 133 to 134 into engagement with the first set of contacts of the bank. The circuit for the ammeter 12 is completed as before, and the needle of the ammeter will point to the right if the device C is closed or to the left if the device C is opened, this control being in the manner hereinbefore pointed out. The despatcher upon noting the position of the device C checks it against his pin record, then supervises the second device by dialling another digit one, which reoperates the switch S to position wipers 133 and 134 upon contacts 147 and 151 respectively, and wipers 135 and 136 upon contacts 175 and 178 respectively. Resistance 154 which is associated with contact 147 and with the contacts upon the second switching device, not shown, is of such a value that when taken into connection with resistances 166 and 167, resistances, 13, 14 and 15, and the resistances of ammeter 12 and conductors 17 and 21, permits enough current to flow from the battery 114 to move the needle of the ammeter 12 to the second position on the scale, to indicate that the second device in the substation has been selected. The needle will move to the right or to the left depending upon whether this second device is open or closed. In this manner, the despatcher by dialling a series of ones, supervises each of these positions at the substation, thereby ascertaining which one changed its position, after which he may take whatever steps he deems necessary.

It will be seen that when the despatcher opened the circuit breaker C as explained above, the chain circuit of relay 103 will be opened and that relay will be deenergized. When the despatcher releases the key 7 and relays 104 and 105 deenergized, the circuit just traced for relay 101 will be completed and the ringer 9 will be operated. To make sure that the device he has just operated is the only one which has operated, while the control circuit was closed, the despatcher should dial a series of digits to supervise all of the devices.

*Setting the ammeter*

Since the potential of the battery 114, will change with age, and temperature changes will alter the values of the resistance units and conductors, it will be necessary for the despatcher to make some slight alterations in the resistance values so that the ammeter will correctly indicate the position of the selector switch S. To do this, he dials the digit 10, positioning the wipers 133 and 134 upon contacts 149 and 152 respectively, thereby including the resistance 156 in the circuit with resistances 166 and 167 and 13, 14 and 15. The total value of the resistance in this circuit should now be such that the ammeter needle will swing to position 10, and if the ammeter needle fails to swing to position 10, the despatcher adjusts the value of resistance 14 so that the needle will indicate correctly. In practice, the despatcher would perform the checking operation frequently, keeping the value of resistance 14 such that the needle will always indicate properly. It might be well to note also that the resistances 13 and 15 are separated, resistance 13 being of high value, and resistance 15 being somewhat lower. Resistance 15 is separated out from the resistance 13 so that the installer, may adjust the resistance 15 to a value to give correct readings on the particular line conductors 17 and 21 with which apparatus is being used. That is, on each installation, because of the variation in the length of conductors 17 and 21, resistance 15 will be of slightly different value, however, once this value is set, it need not be changed, and whatever variations are necessary in the resistance in the circuit, can be made by adjustment of the resistance unit 14. This unit, may preferably be the type of a rheostat, known as a filament control rheostat, as used in a radio set, and should preferably have a total resistance of about 5,000 ohms.

Having thus described my invention, what I consider new and desire to have protected by Letters Patent is pointed out in the appended claims.

What is claimed is:

1. In a remote control system, a plurality of switching devices each having an open and a closed position, a set of signal contacts associated with each of said positions and closed when the device is in that position, a contact individual to each device, a battery, means including said signal contacts for connecting said individual contact to one terminal of said battery when the device is in one position and to the opposite terminal when the device is in the opposite position, means individual to each contact for modifying the current supplied by the battery in a manner individual to such contact, means for selecting one of said devices and means responsive to such selection and including the individual contact, the modifying means and the signal contacts for indicating the device selected and its position.

2. In a remote control system, a plurality of switching devices each having an open and a closed position, a set of signal contacts associated with each of said positions and closed when the device is in that position, a contact individual to said device, a battery, means including said signal contacts for connecting said individual contact to one terminal of said battery when the device is in one position and to the opposite terminal when the device is in the opposite position, means individual to each contact for modifying the current supplied by the battery in a manner individual to such contact, a zero center ammeter having a scale indicating the open and closed positions of each device, means for associating said ammeter with a device, and means including said ammeter, contact, and battery, for indicating the device selected and its position.

3. In a remote control system, a plurality of switching devices each having a plurality of positions, a resistance element individual to each of said devices, and having a resistance value characteristic of that device, a selecting switch having access to said devices, a battery, contacts on said devices for connecting one or the other pole of said battery to said resistance depending upon the position of said device, means for operating said switch to select one of said devices, means including an ammeter connected in circuit with the battery and resistance individual to that device by said selecting switch for checking the accuracy of said selection and the position of the selected device, means in said switch for operating the selected device, and means including said ammeter for indicating the operated position of the device.

4. In a remote control system, a plurality of power switching devices each having a plurality of positions, a selecting switch having a contact for each of said devices, means for operating said selecting switch to select one of said switching devices, a current sensitive device, and means for connecting said current sensitive device in a circuit with said selecting switch and selected switching device, means associated with the switching device for adjusting the intensity of the current flowing in said circuit to indicate the device, and means depending upon the position of that device for adjusting the polarity of that current to indicate said position.

5. In a remote control system, a plurality of switching devices each having a plurality of positions, a selecting switch having access thereto, a four conductor trunk terminating in said selecting switch, means for transmitting direct current impulses over the first and a common one of said conductors to operate said switch to select one of said devices, means for transmitting direct current of variable intensity and polarity over a second one of said conductors and a second common one of said conductors to check said selection and the position of the selected device, means for transmitting currents of variable polarity over said second common conductor and said first common conductor to operate said selected device to change its position and means for transmitting an alternating current over said first conductor and said first common conductor to indicate that a device has changed its position.

6. In a remote control system, a control station and a substation, three conductors connecting said control station with said substation, a plurality of switching devices at the substation, means at the substation controlled over the first of said conductors from the control station for selecting one of said devices, an ammeter at the control station for indicating the device selected, a circuit for operating said ammeter including means individual to the selected device and the second and third of said conductors, means including a relay in the substation for operating any selected device, a circuit for operating said relay including the first and second of said conductors, and a key at the control station for closing said relay circuit or said ammeter circuit.

7. In a remote control system, a control station and a substation, a trunk line comprising an operating conductor, a supervisory conductor and a common conductor connecting said control station with said substation, a plurality of switching devices at the substation, means at the substation controlled over the operating conductor for selecting one of said devices, means at the control station controlled over the supervisory conductor connected in series with said common conductor for checking the said selection, means at the substation controlled from the control station over the operating conductor connected in series with the common conductor for operating said selected device, and means at the control station controlled over said operating conductor for indicating that a device has operated.

8. In a remote control system, a plurality of switching devices each having a plurality of positions, an automatic switch having wipers and contacts accessible thereto, a pair of signalling conductors individual to each device and each signalling conductor terminating in an individual one of said contacts, a pair of supervisory conductors common to said devices and each common supervisory conductor terminating in a horizontal row of multiply connected ones of said contacts, a source of battery common to said devices, means individual to each device for modifying the flow of current supplied by said battery, means for operating the wipers of said switch to select a set of said contacts individual to one of said devices, means including two sets of said wipers for connecting said source of battery, the pair of signalling conductors individual to the selected contacts and said common supervisory conductors in series, means individual to the selected device and dependent upon its position for varying the direction of the flow of current in said connection, and means operated responsive to said established connection and current flow for indicating the device selected and its position.

9. In a remote control system, a plurality of switching devices each having an open and a closed position, a resistance element individual to each device and having a resistance value characteristic of that device, an ammeter, means for associating said ammeter with said devices one at a time, and means dependent upon the respective positions of said devices and their individual resistances for operating said ammeter to determine the device with which the ammeter is then associated and the particular position occupied by said device.

10. In a remote control system, a plurality of switching devices each having two positions, a selector operated from a remote control point to select a desired device, a checking circuit, means associated with the selected device for altering the resistance of said circuit and controlled by the position of the device to alter the direction of current flow therein, and an ammeter included in said circuit at the control point responsive to said alterations to simultaneously indicate the selected device and its position.

In witness whereof, I hereunto subscribe my name this 31st day of August, A. D. 1927.

HARRY E. HERSHEY.